(12) United States Patent
Sekino et al.

(10) Patent No.: US 10,987,912 B2
(45) Date of Patent: Apr. 27, 2021

(54) EMBOSSED DECORATIVE SHEET AND METHOD FOR PRODUCING THE SAME

(71) Applicant: TOPPAN PRINTING CO., LTD., Tokyo (JP)

(72) Inventors: Mineo Sekino, Tokyo (JP); Takanori Matsuzawa, Tokyo (JP); Kahei Murata, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 87 days.

(21) Appl. No.: 16/297,683

(22) Filed: Mar. 10, 2019

(65) Prior Publication Data

US 2019/0202192 A1  Jul. 4, 2019

Related U.S. Application Data

(63) Continuation of application No. PCT/JP2016/086073, filed on Dec. 5, 2016.

(30) Foreign Application Priority Data

Sep. 12, 2016 (JP) .............................. JP2016-177870
Oct. 11, 2016 (JP) .............................. JP2016-199880

(51) Int. Cl.
  *B32B 7/12* (2006.01)
  *B32B 38/06* (2006.01)
  (Continued)

(52) U.S. Cl.
  CPC .............. *B32B 38/06* (2013.01); *B29C 66/45* (2013.01); *B32B 3/28* (2013.01); *B32B 3/30* (2013.01);
  (Continued)

(58) Field of Classification Search
  CPC ................ B29C 66/45; B32B 2250/03; B32B 2250/05; B32B 2250/24; B32B 2255/10; B32B 2255/26; B32B 2270/00; B32B 2274/00; B32B 2307/402; B32B 2307/4023; B32B 2307/412;
  (Continued)

(56) References Cited

FOREIGN PATENT DOCUMENTS

JP  H05-278137 A  10/1993
JP  H06-328635 A  11/1994
  (Continued)

OTHER PUBLICATIONS

Nishikawa et al (JP 2011069060 A), Apr. 7, (Year: 2011).*
  (Continued)

*Primary Examiner* — Lawrence D Ferguson
(74) *Attorney, Agent, or Firm* — Foley & Lardner LLP

(57) ABSTRACT

An embossed decorative sheet that can have various characteristics, and a method for producing the same. An embossed decorative sheet according to one embodiment of the present invention has a structure in which a patterned layer, an adhesive layer, a transparent thermoplastic resin layer, and a surface protective layer are laminated in this order on a thermoplastic resin substrate sheet, and in which an embossed pattern is formed on at least an outermost layer. The transparent thermoplastic resin layer has a structure including a first resin layer, an adhesive layer, and a second resin layer.

20 Claims, 3 Drawing Sheets

(51) Int. Cl.
*B32B 27/08* (2006.01)
*B32B 3/30* (2006.01)
*B32B 27/30* (2006.01)
*B32B 27/40* (2006.01)
*B32B 27/18* (2006.01)
*B32B 27/36* (2006.01)
*B32B 3/28* (2006.01)
*B32B 27/16* (2006.01)
*B32B 27/32* (2006.01)
*B29C 65/00* (2006.01)

(52) U.S. Cl.
CPC ............... *B32B 7/12* (2013.01); *B32B 27/08* (2013.01); *B32B 27/16* (2013.01); *B32B 27/18* (2013.01); *B32B 27/30* (2013.01); *B32B 27/304* (2013.01); *B32B 27/308* (2013.01); *B32B 27/32* (2013.01); *B32B 27/36* (2013.01); *B32B 27/40* (2013.01); *B32B 2250/03* (2013.01); *B32B 2250/05* (2013.01); *B32B 2250/24* (2013.01); *B32B 2255/10* (2013.01); *B32B 2255/26* (2013.01); *B32B 2270/00* (2013.01); *B32B 2274/00* (2013.01); *B32B 2307/4023* (2013.01); *B32B 2307/412* (2013.01); *B32B 2307/54* (2013.01); *B32B 2307/554* (2013.01); *B32B 2307/71* (2013.01); *B32B 2307/712* (2013.01); *B32B 2307/75* (2013.01); *B32B 2451/00* (2013.01); *B32B 2607/02* (2013.01)

(58) Field of Classification Search
CPC .......... B32B 2307/538; B32B 2307/54; B32B 2307/554; B32B 2307/584; B32B 2307/71; B32B 2307/712; B32B 2307/714; B32B 2307/732; B32B 2307/748; B32B 2307/75; B32B 2307/752; B32B 2451/00; B32B 2607/02; B32B 27/08; B32B 27/10; B32B 27/16; B32B 27/18; B32B 27/281; B32B 27/30; B32B 27/302; B32B 27/304; B32B 27/306; B32B 27/308; B32B 27/32; B32B 27/34; B32B 27/36; B32B 27/365; B32B 27/40; B32B 38/06; B32B 3/28; B32B 3/30; B32B 7/12

See application file for complete search history.

(56) References Cited

FOREIGN PATENT DOCUMENTS

| JP | H10-180960 A | 7/1998 |
|---|---|---|
| JP | H10-211675 A | 8/1998 |
| JP | H11-277694 A | 10/1999 |
| JP | 2010-058350 A | 3/2010 |
| JP | 2010-069851 A | 4/2010 |
| JP | 2010-082826 A | 4/2010 |
| JP | 2011-067975 A | 4/2011 |
| JP | 2011-069060 A | 4/2011 |

OTHER PUBLICATIONS

Extended European Search Report dated May 10, 2019 in corresponding application No. 16915778.1.
International Searching Authority, "International Search Report," issued in connection with International Patent Application No. PCT/JP2016/086073, dated Jan. 31, 2017.
International Searching Authority, "Written Opinion," issued in connection with International Patent Application No. PCT/JP2016/086073, dated Jan. 31, 2017.

* cited by examiner

EMBOSSED DECORATIVE SHEET AND METHOD FOR PRODUCING THE SAME

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2016/086073, filed on Dec. 5, 2016, which is based upon and claims the benefit of priority to Japanese Patent Application Nos. 2016-177870, filed on Sep. 12, 2016 and 2016-199880, filed on Oct. 11, 2016; the disclosures of which are all incorporated herein by reference in their entireties.

TECHNICAL FIELD

The present invention relates to an embossed decorative sheet and a method for producing the same.

BACKGROUND ART

Conventionally, there are embossed decorative sheets that are bonded together with surfaces of wooden boards, inorganic boards, steel plates, etc., using an adhesive to form decorative plates. As such embossed decorative sheets, those using vinyl chloride resins are generally used. However, chlorine generation from incineration etc. has recently been problematic, and there have been demands for embossed decorative sheets that do not use vinyl chloride resins (see, for example, PTL 1).

CITATION LIST

Patent Literature

PTL 1: JP 2010-058350 A

SUMMARY OF THE INVENTION

Technical Problem

However, according to the technique disclosed in PTL 1 described above, it was difficult to impart various characteristics, such as flexibility, embossing suitability, wear resistance, surface hardness, chemical resistance, and stain resistance, to embossed decorative sheets, unlike embossed decorative sheets using vinyl chloride resins.

The present invention has been made focusing on the issue set forth above and has an object to provide an embossed decorative sheet that can have various characteristics, and a method for producing the same.

Attempted Solution to Problem

To improve or even solve the above issue, the embossed decorative sheet according to an aspect of the present invention is characterized in that a patterned layer, an adhesive layer, a transparent thermoplastic resin layer, and a surface protective layer are laminated in this order on a thermoplastic resin substrate sheet; an embossed pattern is formed on at least an outermost layer; and the transparent thermoplastic resin layer includes a plurality of layers.

Desired Advantageous Effects of the Invention

According to an aspect of the present invention, an embossed decorative sheet that can have various characteristics can be provided by selecting the number of layers in the transparent thermoplastic resin layer, the material and thickness of each layer, and the like.

DESCRIPTION OF REPRESENTATIVE EMBODIMENTS

Figure 1:
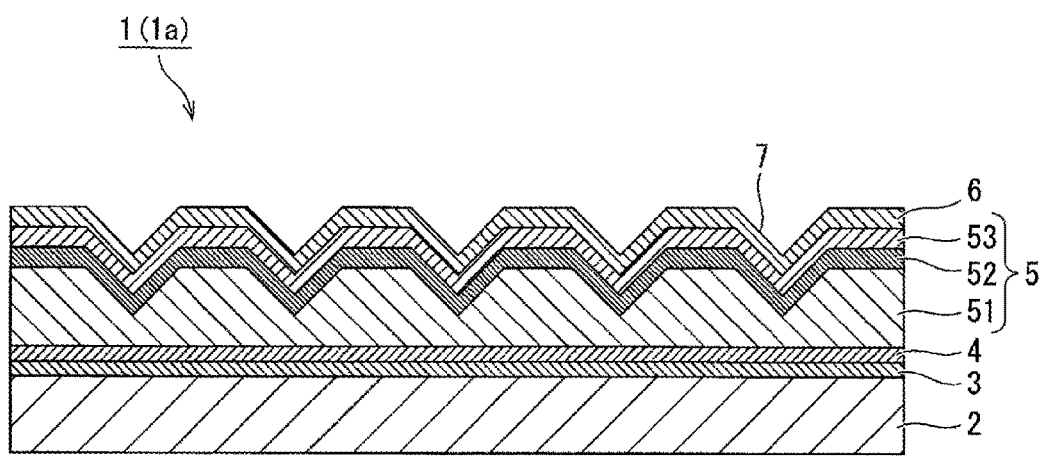
FIG. 1 is a cross-sectional view illustrating the structure of an embossed decorative sheet according to a first embodiment of the present invention.

With reference to the drawings, embodiments of the present invention will be described.

Embodiments of the present disclosure are described in detail below with reference to the drawings. The present invention is not limited to the following representative embodiments, and appropriate modifications can be made without departing from the spirit of the present invention. The representative embodiments described below are merely examples of the present invention, and the design thereof could be appropriately changed by one skilled in the art. In the drawings referred to in the following description, for clarity, characteristic parts may be enlarged, and thus the components may not be shown to scale. Moreover, the positional relationships, such as up and down, left and right, are based on the positional relationships shown in the drawings, unless otherwise specified. Furthermore, the dimension ratios in the drawings are not limited to the ratios shown therein. The drawings herein are schematic. In the drawings, the relationship between thickness and horizontal dimension, the ratio of thickness of each layer, and the like are not to scale. In order to simplify the drawings, well-known structures are shown simplified. In each drawing, the same reference signs are assigned to constituent elements that exhibit the same or similar functions, and redundant description is omitted. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope defined by the claims.

First Embodiment

An embossed decorative sheet 1 and a method for producing the same according to the first embodiment of the present invention are described in detail below.

Embossed Decorative Sheet 1

As shown in FIG. 1, the embossed decorative sheet 1 (1a) according to the present embodiment is formed in such a manner that a patterned layer 3, an adhesive layer 4, a transparent thermoplastic resin layer 5, and a surface protective layer 6 are laminated in this order on a thermoplastic resin substrate sheet 2. Furthermore, an embossed pattern 7 is formed on at least the outermost layer, that is, the surface protective layer 6, in order to control surface gloss and impart a three-dimensional effect. The thickness of the embossed decorative sheet 1 is preferably set within the range of 50 μm or more and 200 μm or less, in consideration of weather resistance and suppression of whitening due to bending, etc.

Thermoplastic Resin Substrate Sheet 2

The thermoplastic resin substrate sheet 2 is a substrate sheet containing a thermoplastic resin. As the thermoplastic resin, various resins other than vinyl chloride resins can be used. Examples thereof that can be used include polyolefin-based resins, acrylic-based resins, polyester-based resins, ethylene vinyl acetate resins, polyimide resins, and the like. In particular, polyolefin-based resins are preferable, in consideration of non-polluting properties, low price, high performance, ease of coloring, etc. More specifically, crystalline polyolefin and polyolefin-based thermoplastic elastomers are preferable.

According to polyolefin-based thermoplastic elastomers, olefin-based resins, which are called hard segments, contain rubber, such as hydrogenated butadiene, as a soft segment; thus, flexibility that is not inherent in conventional polyolefin-based resins can be obtained. Furthermore, those that are excellent in non-polluting properties, price, and ease of coloring by pigment addition, can be obtained.

Examples of thermoplastic elastomers include styrene-based resins, urethane-based resins, polyester-based resins, and the like, in addition to olefin-based resins. However, styrene-based resins have difficulty in coloring due to their structure, urethane-based resins have poor weather resistance, and polyester-based resins have low processability due to the hardness of the film. Accordingly, these resins are not as suitable as the polyolefin-based resin of the thermoplastic resin substrate sheet 2.

Examples other than the above include ethylene-vinyl acetate copolymers, ethylene-vinyl alcohol copolymers, polystyrene, ABS, polymethyl methacrylate, polymethyl acrylate, polybutyl acrylate, polyvinyl acetate, polyvinyl alcohol, polyvinyl butyral, polyvinyl acetal, polyethylene terephthalate, polybutylene terephthalate, polyethylene naphthalate, polycarbonate, polyurethane, polyamide, Nylon 6, Nylon 66, polylactic acid, paper, and the like. These may be used in combination.

The thermoplastic resin substrate sheet 2 may be colored. Examples of the coloring method that can be used include, but are not limited to, a dry color method that uses a fine powder coloring agent obtained by treating a pigment with a dispersion aid or a surfactant; a masterbatch method in which preliminary dispersed masterbatch pellets are produced by melting and mixing a resin and a high-concentration pigment, and dry-blended with a general resin that is not colored in an extrusion hopper; and the like. The type of pigment is not limited; however, in consideration of weather resistance, heat resistance, etc., inorganic pigments, such as titanium oxide, ultramarine blue, cadmium pigment, and iron oxide, are desirable. Furthermore, among organic pigments, phthalocyanine pigments, quinacridone pigments, etc., can be used. The color and mixing ratio of the pigment are freely determined in consideration of the concealing degree, designability, etc., and are not limited.

The thermoplastic resin substrate sheet 2 may be treated with an antioxidant or subjected to weather-resistant treatment. Furthermore, in consideration of the improvement in adhesion to wooden boards, inorganic boards, metal plates, etc., a primer layer may be provided on the back surface of the embossed decorative sheet 1. As the primer layer, for example, a polyester-based resin, a polyurethane-based resin, a mixture thereof, or the like can be used. The details of the primer layer are described later.

The thickness of the thermoplastic resin substrate sheet 2 is preferably set within the range of 10 μm or more and 100 μm or less, in consideration of use for general purposes.

Patterned Layer 3

The patterned layer 3 is a layer that is formed by printing on the thermoplastic resin substrate sheet 2, and that adds a pattern for imparting designability. Examples of the pattern that can be used include a woodgrain pattern, a cork pattern, a grain pattern, a tile pattern, an abstract pattern, and the like. The pigment of the printing ink is, for example, isoindolinone yellow, polyazo red, phthalocyanine blue, carbon black, iron oxide, or titanium oxide; or a mixture thereof. Moreover, examples of the binder that can be used include ethyl acetate, n-butyl acetate, isobutanol, and methyl isobutyl ketone. In particular, in consideration of the adhesion to the thermoplastic resin substrate sheet 2, etc., a binder containing an isocyanate curing agent and active hydrogen is preferable.

In addition to the above substances, any of various resins, such as urethane-based resins, acrylic-based resins, and polyester-based resins, can be used as the binder.

Furthermore, the printing ink may be mixed with a plasticizer, a stabilizer, wax, grease, a drying agent, a curing agent, a thickener, a dispersant, a filler, etc. Examples of the printing method that can be used include gravure printing, screen printing, offset printing, gravure offset printing, intaglio printing, silk printing, electrostatic printing, ink jet printing, and flexographic printing.

Adhesive Layer 4

The adhesive layer 4 is a layer containing an adhesive that bonds the patterned layer 3 and the transparent thermoplastic resin layer 5. The adhesive is suitably selected from, for example, urethane-based adhesives, acrylic-based adhesives, polyester-based adhesives, etc., depending on the combination of the printing ink that constitutes the patterned layer 3, and the resin that constitutes the transparent thermoplastic resin layer 5.

Transparent Thermoplastic Resin Layer 5

The transparent thermoplastic resin layer 5 is a sheet-like layer including a plurality of layers. Each layer is formed from a transparent thermoplastic resin so that the pattern of the patterned layer 3 is visible through the layers. Examples of thermoplastic resins include various resins other than vinyl chloride resins. Various combinations can be used as the combination of resins in each layer, depending on the target characteristics. The number of layers can be four or more; however, the structure of the extruder is complicated, and operation becomes more inconvenient. For this reason, the number of layers is preferably up to three layers.

Figure 2:
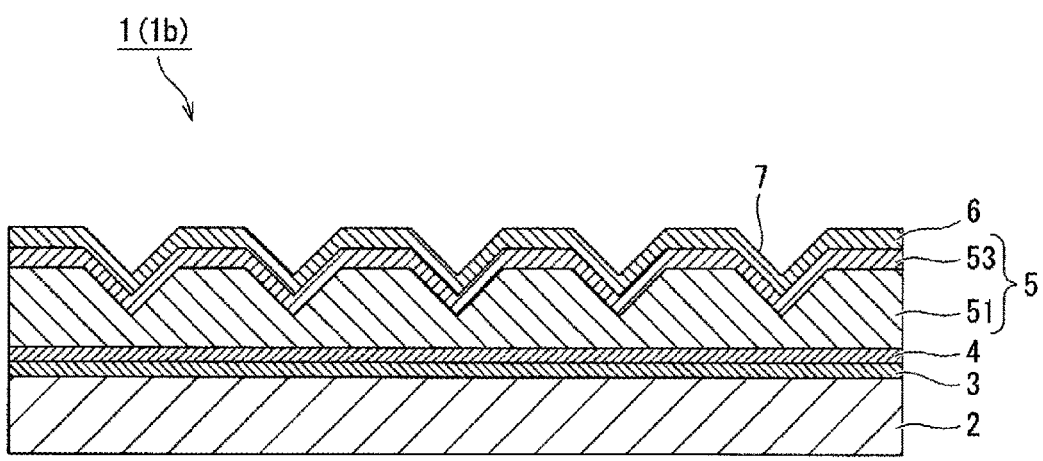
FIG. 2 is a cross-sectional view illustrating the structure of an embossed decorative sheet according to a modification of the first embodiment of the present invention.

In the example of FIG. 1, the transparent thermoplastic resin layer 5 is formed in such a manner that a first resin layer 51 containing a predetermined resin (hereinafter also referred to as the "first resin"), an adhesive layer 52 containing an adhesive, and a second resin layer 53 containing a resin (hereinafter also referred to as the "second resin") that is different from the first resin are laminated in this order from the thermoplastic resin substrate sheet 2 side. Depending on the combination of the first resin and the second resin, the adhesive layer 52 can be omitted, as shown in FIG. 2. Hereinafter, the embossed decorative sheet 1 that does not have the adhesive layer 52 is referred to as "the embossed decorative sheet 1*b*" for convenience.

As the first resin and the second resin, for example, in consideration of adhesion strength by the action of acid groups based on maleic acid, etc., it is preferred that the first resin is a transparent maleic acid-modified polypropylene resin, and the second resin is a transparent polypropylene resin. At least one of an ultraviolet absorber and a light stabilizer is added to the transparent polypropylene resin. The transparent maleic acid-modified polypropylene resin is, for example, a transparent resin obtained by reacting polypropylene with maleic anhydride, and introducing maleic acid residues into a linear polyolefin.

When the first resin layer 51 is a layer containing transparent maleic acid-modified polypropylene, and the second resin layer 53 is a layer containing transparent polypropylene and at least one of an ultraviolet absorber and a light stabilizer, the scratch resistance, weather resistance, stain resistance, light resistance, transparency, bending properties, thermoforming properties, etc., of the surface of the embossed decorative sheet 1 are improved, and material costs etc. can be reduced.

The light stabilizer added to the second resin layer 53 may be an amine-based light stabilizer or an aminoether-based light stabilizer.

For example, in consideration of the scratch resistance, weather resistance, stain resistance, light resistance, transparency, bending properties, thermoforming properties, etc., of the surface of the embossed decorative sheet 1, it is preferred that the first resin is a thermoplastic acrylic resin or a mixture obtained by adding a polyvinylidene fluoride resin to a thermoplastic acrylic resin, and the second resin is a polyvinylidene fluoride resin or a mixture obtained by adding a thermoplastic acrylic resin to a polyvinylidene fluoride resin. In this case, when a mixture of a polyvinylidene fluoride resin and a thermoplastic acrylic resin is used as the adhesive layer 52, adhesion to the first resin layer 51 and the second resin layer 53 can be ensured.

Furthermore, for example, in consideration of the unique texture and softness (flexibility) on the surface side of the embossed decorative sheet 1, material costs, etc., it is preferred that the first resin is a polyolefin-based elastomer resin, and the second resin is a polyurethane-based elastomer resin.

Furthermore, for example, in consideration of the scratch resistance, stain resistance, weather resistance, flexibility, and transparency (depth) of the surface of the embossed decorative sheet 1, cost reduction due to the omission of the adhesive layer 52, etc., it is preferred that the first resin is a soft acrylic resin, and the second resin is a hard acrylic resin.

Moreover, for example, in consideration of the scratch resistance, chemical resistance, and stain resistance of the surface of the embossed decorative sheet 1, cost reduction due to the omission of the adhesive layer 4, etc., it is preferred that the first resin is a polypropylene resin, and the second resin is a polyethylene terephthalate resin. In this case, a special adhesive that adheres to both the first and second resins is used as the adhesive layer 52.

Furthermore, for example, in consideration of cost reduction due to the omission of the adhesive layer 52 and the adhesive layer 4, etc., it is preferred that the first resin is a polypropylene resin, and the second resin is an olefin-based elastomer resin.

Polypropylene Resin

The polypropylene resin of the present embodiment may be, for example, a mixture of a polypropylene resin (a) to which a free terminal long chain branch is imparted, and a polypropylene resin (b) to which a free terminal long chain branch is not imparted, where the molecular weight distribution Mw/Mn, which is defined as the average molecular weight/number average molecular weight of the mixture, is within the range of 1 or more and 5 or less, and the isotactic index of the mixture of the resins (a) and (b), which is specified as the percentage of a boiling heptane soluble residue, is within the range of 1% or more and 90% or less. Whitening and cracking can be thereby better suppressed during bending after the embossed decorative sheet 1 is bonded together with a steel plate substrate.

The molecular weight distribution mentioned herein is a value defined as the ratio Mw/Mn of number average molecular weight $Mn=\Sigma(Mi \times Ni)/\Sigma Ni$ and average molecular weight $Mw=\Sigma(Ni \times Mi2)/\Sigma(Ni \times Mi)$, provided that there are Ni number of molecules with a molecular weight Mi. A value closer to 1 indicates narrower molecular weight distribution and higher uniformity. When the molecular weight distribution is adjusted to 5 or less, the molecular weight can be made uniform to a sufficiently required size, which contributes to the suppression of whitening and cracking. The molecular weight distribution can be generally measured by gel permeation chromatography (GPC).

The isotactic index specified as the percentage of a boiling heptane soluble residue is useful as an indicator for examining the degree of crystallinity in the polypropylene resin. Specifically, a sample is extracted with boiling n-heptane for a predetermined period of time, and the mass (%) of the unextracted portion is determined to calculate the isotactic index. More specifically, an extraction thimble is dried at 110±5° C. for 2 hours, and allowed to stand in a constant-temperature constant-humidity room for 2 hours or more. Then, 8 g or more and 10 g or less of sample (powder or flakes) is placed in the extraction thimble, and precisely weighed using a weighing cup and tweezers. The resultant is set in an upper portion of an extractor containing about 80 cc of heptane, and the extractor and a cooler are assembled. This is heated with an oil bath or an electric heater, and extracted for 12 hours. Heating is adjusted so that the number of drops from the cooler is 130 or more per minute. Subsequently, the extraction thimble containing the extraction residue is removed, placed in a vacuum dryer, and dried at 80° C. under a vacuum of 100 mmHg or less for 5 hours. After drying, the resultant is allowed to stand under constant temperature and constant humidity conditions for 2 hours, and precisely weighed. Then, the isotactic index is determined by (P/Po)×100, where Po is the mass (g) of the sample before extraction, and P is the mass (g) of the sample after extraction.

When the isotactic index is 90% or less, sheet stiffness caused by polypropylene crystals can be better suppressed. Examples of the method for reducing the isotactic index include a method of partially using amorphous polypropylene components (syndiotactic polypropylene, atactic polypropylene, etc.); a method of performing random copolymerization of one or more olefin monomers, such as ethylene and α-olefin; and a method of adding various rubber components (e.g., ethylene-propylene rubber (EPR), ethylene-propylene-diene rubber (EPDM), styrene-butadiene rubber (SBR), acrylonitrile-butadiene rubber (NBR), butadiene rubber (BR), isoprene rubber (IR), and like components).

The melt tension of the resin mixture of the polypropylene resins (a) and (b) (tension when the resin mixture is extruded at a temperature of 230° C. at 60 mm/min and received at 2 mm/min using a nozzle capillary rheometer having a diameter of 2.0 mm) is desirably within the range of 100 mN or more and 500 mN or less. If the melt tension exceeds 500 mN, the melt viscosity is overly high, and stable film formation is not possible. In contrast, if the melt tension is 100 mN or less, long-chain branched components are insufficient, and it is difficult to obtain the desired performance.

Moreover, because the melt flow rate at 230° C., as specified by JIS-K6760, of the mixture of the polypropylene resins (a) and (b) is set within the range of 5 g/10 min or more and 50 g/10 min or less, the molecular weight can be maintained at or above a predetermined value, and a stable film forming state can be maintained. The melt flow rate is more preferably in the range of 10 g/10 min or more and 30 g/10 min or less, and even more preferably 10 g/10 min or more and 25 g/10 min or less. If the melt flow rate exceeds 50 g/10 min, the resin melted and extruded from the T-die is more likely to gather in the center during melting extrusion by the T-die (neck-in), and the thickness of the edge of the resin melted and extruded from the T-die increases. The increased thickness of the edge reduces cooling efficiency and affects the thickness stability in the width direction; thus, stable film formation is difficult. In contrast, if the melt flow rate is lower than 5 g/10 min, the draw resonance of the molten resin decreases, and the molten resin cannot respond to the gap between the rate (initial rate) of the molten resin immediately after being discharged from the T-die and the rate of the resin immediately after contact with the cooling roller; thus, stable film formation is difficult.

Furthermore, in order to impart weather resistance, an ultraviolet absorber, a hindered amine-based light stabilizer, etc., may be added to the transparent thermoplastic resin layer 5 (in particular, the second resin layer 53). Examples of the ultraviolet absorber to be added include benzotriazole-based ultraviolet absorbers, triazine-based ultraviolet absorbers, benzophenone-based ultraviolet absorbers, and the like. The number of parts to be added may be determined depending on the desired weather resistance, but is within the range of 0.1% or more and 50% or less, and preferably within the range of 1% or more and 30% or less, based on the resin solid content.

Examples of benzotriazole-based ultraviolet absorbers include 2-(2-hydroxy-5-t-butylphenyl)-2H-benzotriazole, 2-(5-methyl-2-hydroxyphenyl)benzotriazole, 2-[2-hydroxy-3,5-bis(α,α-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl)benzotriazole, 2-(2'-hydroxy-5'-t-octylphenyl)benzotriazole, etc.; and mixtures, modified products, polymers, and derivatives thereof.

Moreover, examples of triazine-based ultraviolet absorbers include 2-(4,6-diphenyl-1,3,5-triazin-2-yl)-5-[(hexyl)oxy]-phenol, 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, 2,4-bis(2,4-dimethylphenyl)-6-(2-hydroxy-4-iso-octyloxyphenyl)-s-triazine, etc.; and mixtures, modified products, polymers, and derivatives thereof.

Furthermore, examples of benzophenone-based ultraviolet absorbers include octabenzone, modified products, polymers, and derivatives thereof, and the like. Because bonding to resin components due to crosslinking by isocyanate addition can be expected, ultraviolet absorbers having a hydroxyl group are particularly suitable.

Moreover, in order to prevent the degradation of the resin itself due to light, heat, water, etc., a hindered amine-based light stabilizer may be suitably added. The number of parts to be added may be determined depending on the desired weather resistance, but is set within the range of 0.1 mass % or more and 50 mass % or less, and preferably within the range of 1 mass % or more and 30 mass % or less, relative to the resin solid content. Specific examples thereof include bis(1,2,2,6,6-pentamethyl-4-piperidyl)[[3,5-bis(1,1-dimethylethyl)-4-hydroxyphenyl]methyl]butylmalonate, bis(1,2,2,6,6-pentamethyl-4-piperidinyl)sebacate, methyl(1,2,2,6,6-pentamethyl-4-piperidinyl)sebacate, decanedioic acid bis(2,2,6,6-tetramethyl-1-(octyloxy)-4-piperidinyl)ester, etc.; mixtures, modified products, polymers, and derivatives thereof; and the like.

In addition to the above, for example, heat stabilizers, flame retardants, antiblocking agents, etc., may be added. Examples of heat stabilizers that can be used include hindered phenol-based antioxidants, such as pentaerythrityl-tetrakis[3-(3,5-di-t-butyl-4-hydroxyphenyl)]-propionate, 2,4-bis-(n-octylthio)-6-(4-hydroxy-3,5-di-t-butylanilino)-1,3,5-triazine, octadecyl-3-(3,5-di-t-butyl-4-hydroxyphenyl)propionate, 1,3,5-trimethyl-2,4,6-tris(3,5-t-butyl-4-hydroxybenzyl)benzene, and 1,3,5-tris(4-t-butyl-3-hydroxy-2,6-dimethylbenzyl)isocyanuric acid; phenol-based antioxidants, such as 2,2'-methylenebis(4-ethyl-6-t-butylphenol) and 2,2'-methylenebis(4-methyl-6-t-butylphenol); phosphorus-based antioxidants typified by tris(2,4-di-t-butylphenyl)phosphite; and mixtures thereof; that is, these can be used singly or in a combination of two or more.

Moreover, examples of flame retardants that can be used include inorganic compounds, such as aluminum hydroxide, magnesium hydroxide, calcium carbonate, and magnesium carbonate; phosphoric ester-based flame retardants; and the like. Furthermore, examples of antiblocking agents that can be used include inorganic antiblocking agents, such as aluminum silicate, silicon oxide, hydrotalcite, and calcium carbonate; organic antiblocking agents, such as fatty acid amides; and the like. The thickness of the transparent thermoplastic resin layer 5 is preferably set within the range of 10 μm or more and 100 μm or less.

In the transparent thermoplastic resin layer 5 according to the present embodiment, particularly the second resin layer 53 may have a tensile elongation in the range of 50% or more and 700% or less, and a tensile elastic modulus in the range of 2000 kgf/cm$^2$ or more and 10000 kgf/cm$^2$ or less.

When the value of tensile elastic modulus is overly large or overly low, defects, such as burrs, tend to occur during machining etc. after bonding to the decorative plate substrate.

If the tensile elastic modulus is less than 2000 kgf/cm$^2$, the bent part may undergo a whitening phenomenon in a bending test at low temperatures.

Surface Protective Layer 6

The surface protective layer 6 is a layer that is formed on the transparent thermoplastic resin layer 5, and that covers the transparent thermoplastic resin layer 5. Examples of the material of the surface protective layer 6 include those containing a thermosetting resin, an ionizing radiation-curable resin, or a mixture of these resins. The ionizing radiation-curable resins mentioned herein refer to resins that are cured by light irradiation with ultraviolet rays, resins that are cured by irradiation with electron beams, and the like.

Examples of thermosetting resins that can be used include thermosetting resins having a urethane bond, such as two-part curable urethane-based resins.

Examples of ionizing radiation-curable resins that can be used include ultraviolet-curing resins. Examples of ultraviolet-curing resins that can be used include (meth)acrylic-based resins, silicone-based resins, polyester-based resins, urethane-based resins, amide-based resins, and epoxy-based resins. The hardness of the surface protective layer 6, that is, the outermost layer of the embossed decorative sheet 1, can be thereby improved, and the surface physical properties, such as wear resistance, scratch resistance, and solvent resistance, can be enhanced.

Furthermore, in order to impart various functions, functional additives, such as an antimicrobial agent and an antifungal agent, may be added to the surface protective layer 6. Moreover, an ultraviolet absorber and a light stabilizer may be added, if necessary. Examples of ultraviolet absorbers include benzotriazole-based ultraviolet absorbers, benzoate-based ultraviolet absorbers, benzophenone-based ultraviolet absorbers, and triazine-based ultraviolet absorbers. Examples of light stabilizers include hindered amine-based light stabilizers. Furthermore, when contamination control performance and Sellotape (registered trademark) mold-release characteristics are required, a release agent having a silicone skeleton can be added. In this case, the type of release agent is not limited; however, the use of a silicone release agent having an end functional group that is reactive with the resin composition can improve contamination control performance and the durability of Sellotape (registered trademark) mold-release characteristics.

As the light stabilizer, for example, an amine-based light stabilizer or an aminoether-based light stabilizer can be used, in addition to the abovementioned hindered amine-based light stabilizers.

Method for Producing Embossed Decorative Sheet 1

The method for producing the embossed decorative sheet 1 of the present embodiment will now be described.

Figure 3:
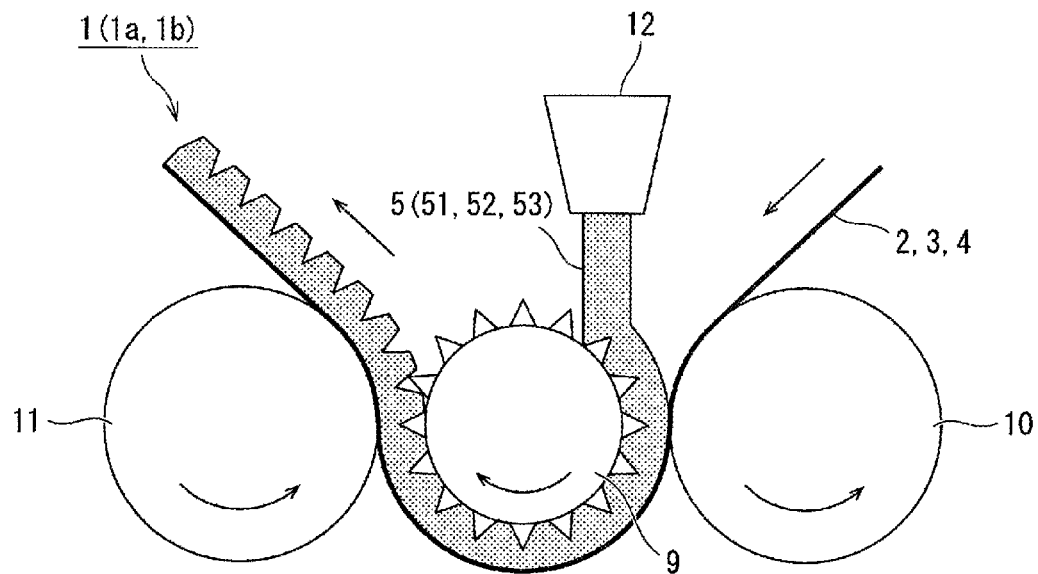
FIG. 3 is a diagram illustrating a method for producing the embossed decorative sheet according the first embodiment of the present invention.

First, a patterned layer 3 is formed by printing on a thermoplastic resin substrate sheet 2. Then, an adhesive is applied to the patterned layer 3 to form an adhesive layer 4. Subsequently, as shown in FIG. 3, a plurality of layers containing a molten transparent thermoplastic resin are extruded from a multilayer extruder 12 and laminated on the adhesive layer 4, thereby forming a transparent thermoplastic resin layer 5 having at least a first resin layer 51 and a second resin layer 53. Simultaneously, the laminate of the thermoplastic resin substrate sheet 2, the patterned layer 3, the adhesive layer 4, and the transparent thermoplastic resin layer 5 is gripped between an embossing roll 9 and a pressure roll 10 to perform embossing and lamination at the same time. The sheet integrated by embossing and lamination is moved along the outer periphery of the embossing roll 9, and peeled by a peeling roll 11, thereby forming unevenness by embossing on the transparent thermoplastic resin layer 5. Thereafter, a thermosetting resin, an ultraviolet-curing resin, or a mixture thereof is applied to the transparent thermoplastic resin layer 5 to form a surface protective layer 6, thereby obtaining an embossed decorative sheet 1 in which an embossed pattern 7 is formed on the surface protective layer 6, that is, the outermost layer.

The embossing roll 9, the pressure roll 10, and the peeling roll 11 each have a cooling mechanism therein, and reduce the temperature of the molten transparent thermoplastic resin to solidify the resin. In the present embodiment, the embossing roll 9 is a metal roll, and the pressure roll 10 and the peeling roll 11 are rubber rolls. Therefore, the embossing roll 9 bears most of the cooling effects; thus, the production rate is determined by the diameter of the embossing roll 9. The production rate increases as the embossing roll 9 has a larger diameter; however, the production cost of the embossing roll 9 also increases. Accordingly, in order to minimize the production cost, it is necessary to comprehensively consider the diameter of the embossing roll 9, production capacity, and the capacity of the extruder.

Figure 4:
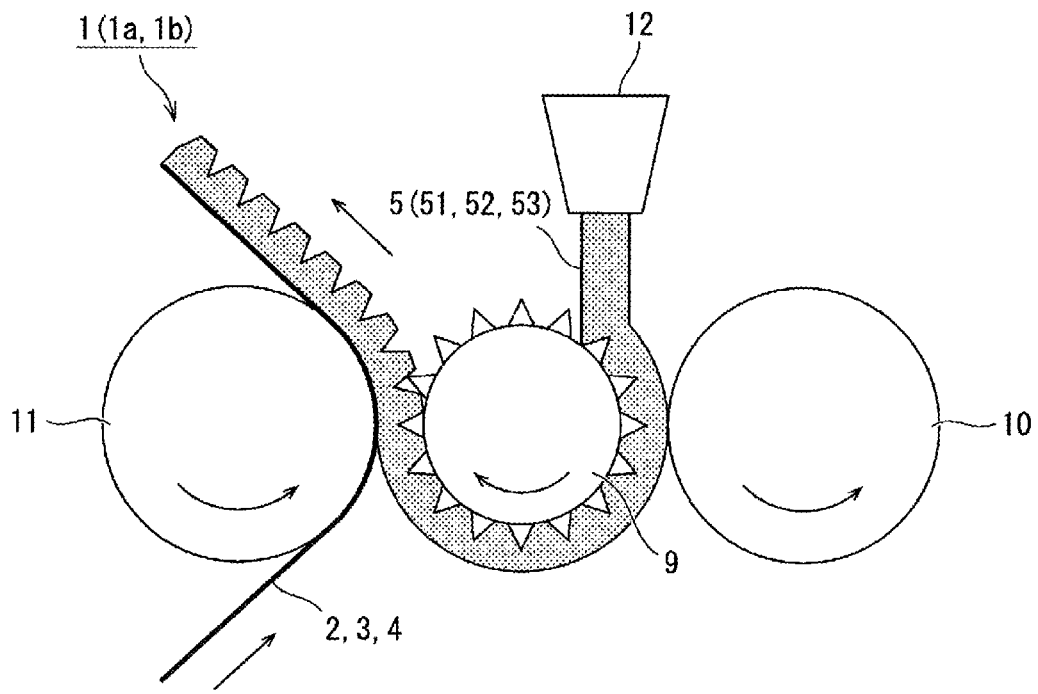
FIG. 4 is a diagram illustrating a method for producing the embossed decorative sheet according the modification of the first embodiment of the present invention.

In the example of FIG. 3, the laminate including the thermoplastic resin substrate sheet 2, the patterned layer 3, and the adhesive layer 4, and the transparent thermoplastic resin layer 5 are inserted together between the embossing roll 9 and the pressure roll 10; however, the insertion position of the laminate may be placed between the embossing roll 9 and the peeling roll 11, as shown in FIG. 4. This is effective when the thermoplastic resin substrate sheet 2 has low thickness and poor heat resistance, although it is necessary to ensure adhesion using an adhesive etc.

Effects of Present Embodiment

The invention according to the present embodiment exhibits the following effects.

(1) As described above, in the embossed decorative sheet 1 according to the present embodiment, the transparent thermoplastic resin layer 5 has a structure including a plurality of layers; thus, an embossed decorative sheet 1 that can have various characteristics can be provided by selecting the number of layers in the transparent thermoplastic resin layer 5, the material and thickness of each layer, and the like.

In this manner, characteristics that can be obtained by using vinyl chloride resins, such as flexibility, stain resistance, chemical resistance, weather resistance, scratch resistance, and designability (mainly transparency), can be obtained.

(2) Moreover, the transparent thermoplastic resin layer 5 has a structure in which a first resin layer 51 containing a first resin, and a second resin layer 53 containing a second resin that is different from the first resin, are laminated in this order from the thermoplastic resin substrate sheet 2 side.

Therefore, the second resin layer 53 can realize the performance of the embossed decorative sheet 1 on the surface side, and the first resin layer 51 can realize other physical properties of the embossed decorative sheet 1, so that the embossed decorative sheet 1 can have various characteristics.

(3) Moreover, the first resin may be a transparent maleic acid-modified polypropylene resin, and the second resin may be a transparent polypropylene resin to which at least one of an ultraviolet absorber and a light stabilizer is added.

The adhesion strength can be thereby improved by the action of acid groups based on maleic acid.

(4) Moreover, the first resin may be a thermoplastic acrylic resin or a mixture obtained by adding a polyvinylidene fluoride resin to a thermoplastic acrylic resin, and the second resin may be a polyvinylidene fluoride resin or a mixture obtained by adding a thermoplastic acrylic resin to a polyvinylidene fluoride resin.

This allows the polyvinylidene fluoride resin on the surface side to impart scratch resistance, weather resistance, stain resistance, etc., to the surface, and allows the acrylic resin on the intermediate side to impart light resistance, transparency, etc. Furthermore, the bending properties and thermoforming properties of the embossed decorative sheet 1 can also be improved.

In particular, because the first resin is a mixture obtained by adding a polyvinylidene fluoride resin to a thermoplastic acrylic resin, and the second resin is a mixture obtained by adding a thermoplastic acrylic resin to a polyvinylidene fluoride resin, the adhesion of the first and second resins can be ensured, and the adhesive layer 52 can be omitted.

(5) Moreover, the first resin may be a polyolefin-based elastomer resin, and the second resin may be a polyurethane-based elastomer resin.

Unique texture and softness can be thereby imparted to the surface side. Furthermore, because a polyolefin-based elastomer resin is used on the intermediate side, the feature of the surface side can be efficiently used, and material costs can be reduced.

(6) Moreover, the first resin may be a soft acrylic resin, and the second resin may be a hard acrylic resin.

The scratch resistance, stain resistance, weather resistance, and flexibility of the surface can be thereby improved, and the transparency of the surface layer can be significantly enhanced. Furthermore, material costs can be reduced because the adhesive layer 52 can be omitted, as shown in FIG. 2.

(7) Moreover, the first resin may be a polypropylene resin, and the second resin may be a polyethylene terephthalate resin.

The scratch resistance, chemical resistance, and stain resistance of the surface can be thereby improved, and the adhesive layer 4 can be omitted; thus, material costs can be reduced.

(8) Moreover, the first resin may be a polypropylene resin, and the second resin may be an olefin-based elastomer resin.

The adhesive layer 52 and the adhesive layer 4 can be thereby omitted; thus, material costs can be reduced. The transparency and weather resistance of the surface layer are slightly inferior; however, it can be sufficiently used for indoor materials.

(9) Moreover, the surface protective layer 6 may contain a thermosetting resin, an ionizing radiation-curable resin, or a mixture of these resins, to all of which at least one of an ultraviolet absorber and a light stabilizer is added.

The hardness of the surface protective layer 6, that is, the outermost layer of the embossed decorative sheet 1, can be thereby improved, and the surface physical properties, such as wear resistance, scratch resistance, and solvent resistance, can be enhanced.

(10) Moreover, the transparent thermoplastic resin layer 5 may have a tensile elongation in the range of 50% or more and 700% or less, and a tensile elastic modulus in the range of 2000 kgf/cm$^2$ or more and 10000 kgf/cm$^2$ or less.

This makes it possible to obtain characteristics that can be obtained from polyvinyl chloride resins, such as flexibility, stain resistance, chemical resistance, weather resistance, scratch resistance, and designability (mainly transparency), without actually using polyvinyl chloride resins; and to form an embossed pattern 7 having excellent reproducibility.

(11) Moreover, the second resin layer 53 may have a tensile elongation in the range of 50% or more and 700% or less, and a tensile elastic modulus in the range of 2000 kgf/cm$^2$ or more and 10000 kgf/cm$^2$ or less.

The second resin layer 53 thereby serves as a main part of the transparent thermoplastic resin layer 5, and the range of material design can be expanded.

(12) In the method for producing the embossed decorative sheet 1 according to the present embodiment, a patterned layer 3 is formed by printing on a thermoplastic resin substrate sheet 2; a plurality of layers containing a molten transparent thermoplastic resin are then extruded from a multilayer extruder 12 and laminated on the patterned layer 3 to thereby form a transparent thermoplastic resin layer 5; the transparent thermoplastic resin layer 5 is embossed at the same time; and a surface protective layer 6 is then formed on the transparent thermoplastic resin layer 5.

This makes it possible to obtain characteristics such as flexibility, stain resistance, chemical resistance, weather resistance, scratch resistance, and designability (mainly transparency), which are equivalent to those of vinyl chloride resins; and to form an embossed pattern 7 having excellent reproducibility.

Furthermore, because the transparent thermoplastic resin is extruded and immediately embossed, the reproducibility of the embossed shape can be enhanced. Moreover, because the extruded resin is inevitably cooled rapidly, resins that are likely to become cloudy due to crystallization, such as polyvinylidene fluoride, can maintain transparency.

Furthermore, because the molten transparent thermoplastic resin is extruded into a sheet-like shape, there is less energy loss and there are more advantages in terms of costs, compared with, for example, when a plurality of sheet-like resins once molded into films are heated again to bond them together and embossed.

FIRST EXAMPLE

Examples of the present embodiment will now be described.

Example 1-1

In Example 1-1, a polypropylene film ("FZ," produced by Riken Technos Corp.) was used as a thermoplastic resin substrate sheet 2. The thickness of the thermoplastic resin substrate sheet 2 was 55 µm. A woodgrain pattern was printed on the thermoplastic resin substrate sheet 2 by a gravure printer to form a patterned layer 3. The printing ink used was gravure ink ("Lamistar," produced by Toyo Ink Co., Ltd.). Subsequently, a primer containing silica powder (produced by Toyo Ink Co., Ltd.) was applied to a surface (back surface) of the thermoplastic resin substrate sheet 2 on the side facing away from the patterned layer 3, thereby forming a primer layer. The coating thickness of the primer layer containing silica powder was 1 µm. Then, a two-part curable polyester-based anchor coat agent (produced by Mitsui Chemicals, Inc.) was applied to the patterned layer 3 to form an adhesive layer 4. The coating thickness of the adhesive layer 4 was 1 µm.

Subsequently, a first resin layer 51 containing transparent maleic acid-modified polypropylene ("AT2102," produced by Mitsui Chemicals, Inc.) as a molten transparent thermoplastic resin, and a second resin layer 53 containing transparent polypropylene ("E2000," produced by Prime Polymer Co., Ltd.) were extruded from a multilayer extruder 12 and laminated on the adhesive layer 4 to thereby form a transparent thermoplastic resin layer 5. The film thickness ratio of the first resin layer 51 to the second resin layer 53 was 1:9. The thickness of the transparent thermoplastic resin layer 5 was 70 to 80 μm. Simultaneously, the laminate of the thermoplastic resin substrate sheet 2, the patterned layer 3, the adhesive layer 4, and the transparent thermoplastic resin layer 5 was gripped between an embossing roll 9 and a pressure roll 10 to perform embossing and lamination at the same time. The sheet integrated by embossing and lamination was moved along the outer periphery of the embossing roll 9, and peeled by a peeling roll 11, thereby forming unevenness by embossing on the transparent thermoplastic resin layer 5.

Thereafter, as a surface protective layer 6 mainly containing a curable resin, a thermosetting resin (urethane acrylate resin, produced by DIC Graphics Corporation) was applied to the transparent thermoplastic resin layer 5. The coating amount of the ultraviolet-curing resin after drying was 6 to 7 g/m². Subsequently, curing was performed by UV irradiation to thereby form the surface protective layer 6. Thus, an embossed decorative sheet 1 of Example 1-1 in which an embossed pattern 7 was formed on the surface protective layer 6, that is, the outermost layer, was obtained.

The embossed decorative sheet 1 obtained in this manner had a high adhesion strength between the transparent thermoplastic resin layer 5 and the adhesive layer 4 (patterned layer 3), owing to the action of acid groups based on maleic acid.

Example 1-2

In Example 1-2, a polyolefin-based inorganic filler sheet ("OW," produced by Riken Technos Corp.) was used as the thermoplastic resin substrate sheet 2. Moreover, a urethane resin-based adhesive was used as the adhesive layer 4. Furthermore, in the transparent thermoplastic resin layer 5, a thermoplastic acrylic resin ("Acrypet IRS404," produced by Mitsubishi Rayon Co., Ltd.) was used for the first resin layer 51 (first resin), a mixture of 50 mass % of polyvinylidene fluoride resin ("Neoflon PVDF," produced by Daikin Industries, Ltd.) and 50 mass % of thermoplastic acrylic resin ("Acrypet IRS404," produced by Mitsubishi Rayon Co., Ltd.) was used for the adhesive layer 52 (adhesive), and a polyvinylidene fluoride resin ("Neoflon PVDF," produced by Daikin Industries, Ltd.) was used for the second resin layer 53 (second resin).

The thickness of the second resin layer 53 was 10 μm, the thickness of the adhesive layer 52 was 10 μm, and the thickness of the first resin layer 51 was 40 μm. Other structures were the same as Example 1-1. The embossed decorative sheet 1 obtained in this manner had moderate flexibility and excellent surface scratch resistance and weather resistance, as well as excellent stain resistance and very high reproducibility of the embossed pattern 7; thus, its commodity value was high. Furthermore, the adhesion strength between the layers was not problematic.

Example 1-3

In Example 1-3, in the transparent thermoplastic resin layer 5, a mixture of 80 mass % of thermoplastic acrylic resin ("Acrypet1RS404," produced by Mitsubishi Rayon Co., Ltd.) and 20 mass % of polyvinylidene fluoride resin ("Neoflon PVDF," produced by Daikin Industries, Ltd.) was used for the first resin layer 51 (first resin), and a mixture of 80 mass % of polyvinylidene fluoride resin ("Neoflon PVDF," produced by Daikin Industries, Ltd.) and 20 mass % of thermoplastic acrylic resin ("Acrypet IRS404," produced by Mitsubishi Rayon Co., Ltd.) was used for the second resin layer 53 (second resin). As shown in FIG. 2, the adhesive layer 52 was omitted. The thickness of the second resin layer 53 was 10 μm, and the thickness of the first resin layer 51 was 40 μm. Other structures were the same as Example 1-2. The embossed decorative sheet 1 obtained in this manner had surface resistance slightly lower than that of the embossed decorative sheet 1 of Example 1-2, but was not inferior to decorative sheets using a vinyl chloride resin.

Example 1-4

In Example 1-4, in the transparent thermoplastic resin layer 5, a polyolefin-based elastomer resin ("Milastomer," produced by Mitsui Petrochemical Industries, Ltd.) was used for the first resin layer 51 (first resin), a graft-polymerized special adhesive resin was used for the adhesive layer 52 (adhesive), and a polyurethane-based elastomer resin ("Miractran," produced by Nippon Miractran Co., Ltd.) was used for the second resin layer 53 (second resin). Other structures were the same as Example 1-2. The embossed decorative sheet 1 obtained in this manner was rich in unique texture and softness (flexibility) on the surface side. Furthermore, the cost thereof was less than the embossed decorative sheets 1 of Examples 1-1 to 1-3.

Example 1-5

In Example 1-5, in the transparent thermoplastic resin layer 5, a soft acrylic resin ("Acrypet SV," produced by Mitsubishi Rayon Co., Ltd.) was used for the first resin layer 51 (first resin), and a hard acrylic resin ("Acrypet IRG304," produced by Mitsubishi Rayon Co., Ltd.) was used for the second resin layer 53 (second resin). As shown in FIG. 2, the adhesive layer 52 was omitted. The thickness of the second resin layer 53 was 10 μm, and the thickness of the first resin layer 51 was 40 μm. Other structures were the same as Example 1-2. The embossed decorative sheet 1 obtained in this manner had excellent surface layer transparency and excellent design with a feeling of depth. Furthermore, the scratch resistance and flexibility of the surface were well balanced, and the cost thereof was less than the embossed decorative sheets 1 of Examples 1-1 to 1-4. However, the solvent resistance was slightly inferior to that of the embossed decorative sheets 1 of Examples 1-1 to 1-4.

Example 1-6

In Example 1-6, in the transparent thermoplastic resin layer 5, a polypropylene resin ("E2000," produced by Prime Polymer Co., Ltd., "Daicel PP," produced by Daicel Polymer Ltd., etc.) was used for the first resin layer 51 (first resin), a graft-polymerized special adhesive resin was used for the adhesive layer 52 (adhesive), and a polyethylene terephthalate resin ("E5100," produced by Toyobo Co., Ltd., "T60," produced by Toray Industries, Inc., etc.) was used for the second resin layer 53 (second resin). Other structures were the same as Example 1-2. The embossed decorative sheet 1 obtained in this manner had excellent surface scratch resistance, chemical resistance, and stain resistance. In addition, the adhesive layer 4 can be omitted, and material costs can be suppressed.

Example 1-7

In Example 1-7, in the transparent thermoplastic resin layer 5, a polypropylene resin ("E2000," produced by Prime Polymer Co., Ltd., "Daicel PP," produced by Daicel Polymer Ltd., etc.) was used for the first resin layer 51 (first resin), and an olefin-based elastomer resin ("Milastomer," produced by Mitsui Petrochemical Industries, Ltd.) was used for the second resin layer 53 (second resin). The thickness of the second resin layer 53 was 10 µm, and the thickness of the first resin layer 51 was 40 µm. Other structures were the same as Example 1-2. The embossed decorative sheet 1 obtained in this manner was slightly inferior in the transparency and weather resistance of the surface layer; however, it was sufficiently usable for indoor materials. Furthermore, the sheet could be produced at the lowest cost because the adhesive layer 52 and the adhesive (adhesive layer 4) applied to the substrate were not required.

Second Embodiment

An embossed decorative sheet 1 and a method for producing the same according to the second embodiment of the present invention are described below.

Embossed Decorative Sheet 1

Figure 5:
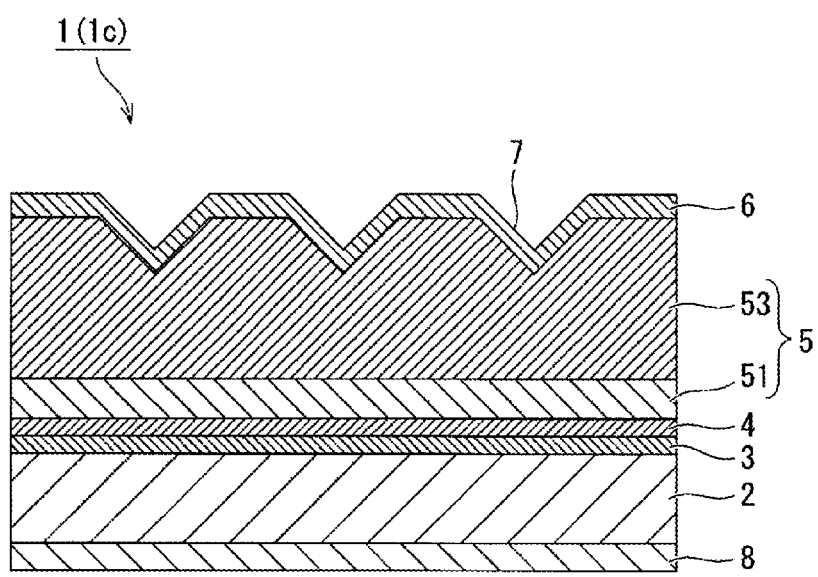
FIG. 5 is a cross-sectional view illustrating the structure of an embossed decorative sheet according to a second embodiment of the present invention.

As shown in FIG. 5, the embossed decorative sheet 1 (1c) according to the present embodiment is formed in such a manner that a patterned layer 3, an adhesive layer 4, and a transparent thermoplastic resin layer 5 are laminated in this order on a thermoplastic resin substrate sheet 2. Moreover, an embossed pattern 7 is formed in at least the transparent thermoplastic resin layer 5 in order to control surface gloss and impart a three-dimensional effect. Furthermore, a surface protective layer 6 is laminated on the embossed pattern 7 formed in the transparent thermoplastic resin layer 5. Furthermore, surface activation treatment is applied to the back surface side of the thermoplastic resin substrate sheet 2, and a primer layer 8 is provided on the surface to which surface activation treatment is applied. The thickness of the embossed decorative sheet 1 is preferably 50 µm or more and 200 µm or less, in consideration of weather resistance, suppression of whitening due to bending, etc.

Thus, in the embossed decorative sheet 1 (1c) according to the present embodiment, the primer layer 8 is provided on the back surface side of the thermoplastic resin substrate sheet 2 provided in the embossed decorative sheet 1 (1b) according to the first embodiment described above. Accordingly, the configuration of the embossed decorative sheet 1 (1c) according to the present embodiment is described below, mainly with regard to the portions having structures that are different from the embossed decorative sheet 1 (1a, 1b) according to the first embodiment.

Thermoplastic Resin Substrate Sheet 2

Surface activation treatment is applied to at least one surface (back surface) side of the thermoplastic resin substrate sheet 2 when the primer layer 8 is provided.

Examples of surface activation treatment include, but are not limited to, corona discharge treatment, flame treatment, ultraviolet treatment, high-frequency treatment, glow discharge treatment, active plasma treatment, laser treatment, ozone acid treatment, mechanical treatment, and various other treatment methods.

The configuration of the thermoplastic resin substrate sheet 2 of the present embodiment is the same as the configuration of the thermoplastic resin substrate sheet 2 described in the first embodiment, except for the above. Accordingly, the explanation of the same component parts as those of the first embodiment is omitted herein.

Patterned Layer 3

The patterned layer 3 is the same as the patterned layer 3 described in the first embodiment. Accordingly, the explanation thereof is omitted herein.

Adhesive Layer 4

The adhesive layer 4 is the same as the adhesive layer 4 described in the first embodiment. Accordingly, the explanation thereof is omitted herein.

Transparent Thermoplastic Resin Layer 5

In the transparent thermoplastic resin layer 5, it is particularly desirable that the second resin layer 53 has a tensile elongation in the range of 50% or more and 700% or less, and a tensile elastic modulus in the range of 2000 kgf/cm$^2$ or more and 10000 kgf/cm$^2$ or less.

When the value of tensile elastic modulus is overly large or overly low, defects, such as burrs, tend to occur during machining etc. after bonding to the decorative plate substrate.

If the tensile elastic modulus is less than 2000 kgf/cm$^2$, the bent part may undergo a whitening phenomenon in a bending test at low temperatures.

As the light stabilizer added to the transparent thermoplastic resin layer 5, it is desirable to use an amine-based or aminoether-based light stabilizer. Specific examples thereof include bis(1,2,2,6,6-pentamethyl-4-piperidyl)[[3,5-bis(1,1-dimethylethyl)-4-hydroxyphenyl]methyl]butylmalonate, bis (1,2,2,6,6-pentamethyl-4-piperidinyl)sebacate, methyl(1,2, 2,6,6-pentamethyl-4-piperidinyl)sebacate, decanedioic acid bis(2,2,6,6-tetramethyl-1-(octyloxy)-4-piperidinyl)ester, etc.; mixtures, modified products, polymers, and derivatives thereof; and the like.

The number of parts to be added may be determined depending on the desired weather resistance, but is set within the range of 0.1 mass % or more and 50 mass % or less, and preferably within the range of 1 mass % or more and 30 mass % or less, relative to the resin solid content.

The configuration of the transparent thermoplastic resin layer 5 of the present embodiment is the same as the configuration of the transparent thermoplastic resin layer 5 described in the first embodiment, except for the above. Accordingly, the explanation of the same component parts as those of the first embodiment is omitted herein.

Surface Protective Layer 6

As the surface protective layer 6, any resin composition can be used, as long as it plays the role of surface protection and gloss control. In particular, a thermosetting resin, an ionizing radiation-curable resin, or a mixture thereof is desirable.

Specific examples of such resin compositions include, but are not limited to, polyurethane-based resins, acrylic silicon-based resins, fluorine-based resins, epoxy-based resins, vinyl-based resins, polyester-based resins, melamine-based resins, amino alkyd-based resins, urea-based resins, monomers and oligomers having a vinyl group, and the like.

Moreover, examples of the form of the resin composition include, but are not limited to, an aqueous form, an emulsion form, a solvent form, and the like.

Furthermore, the method for curing the resin composition can be suitably selected from, for example, one-part type, two-part type, an ultraviolet curing method, an electron beam curing method, and the like.

Among these, thermosetting types using an isocyanate are preferable in terms of workability, price, the cohesive force of the resins themselves, etc.

The isocyanate can be suitably selected from, for example, tolylene diisocyanate (TDI), xylylene diisocyanate (XDI), hexamethylene diisocyanate (HMDI), meta-diisocyanate (MDI), lysine diisocyanate (LDI), isophorone diisocyanate (IPDI), methylhexane diisocyanate (HTDI), methylcyclohexanone diisocyanate (HXDI), trimethylhexamethylene diisocyanate (TMDI), and the like.

The surface protective layer 6 contains an ultraviolet absorber, a light stabilizer, or a mixture thereof. Examples of ultraviolet absorbers include various organic ultraviolet absorbers mentioned above, such as benzotriazole-based ultraviolet absorbers, triazine-based ultraviolet absorbers, and benzophenone-based ultraviolet absorbers; as well as inorganic ultraviolet absorbers typified by zinc oxide, inorganic or organic ultraviolet absorber vesicles, and the like.

As the light stabilizer, for example, an aforementioned amine-based light stabilizer or aminoether-based light stabilizer is preferably used.

Furthermore, in order to impart various functions, functional additives, such as an antimicrobial agent and an antifungal agent, may be added to the surface protective layer 6. Furthermore, there is no problem even if alumina, silica, silicon nitride, silicon carbide, glass beads, etc., are added for the purpose of improving designability, such as surface gloss control, and imparting abrasion resistance, etc.

Primer Layer 8

The primer layer 8 is provided on the back surface of the thermoplastic resin substrate sheet 2 to which surface activation treatment is applied, as described above.

Examples of the primer layer 8 include polyester-based resins, polyurethane-based resins, mixtures thereof, and the like.

Furthermore, a two-part type of a polyol and an isocyanate can improve the adhesion between the sheet and the primer, and the cohesive force of the primer itself. Examples of polyols include acrylic polyol, polyester polyol, and the like.

Moreover, examples of isocyanates include aromatic isocyanates, such as tolylene diisocyanate and 4,4'-diphenylmethane diisocyanate; and aliphatic isocyanates, such as hexamethylene diisocyanate, isophorone diisocyanate, and xylene diisocyanate. Aromatic isocyanates are preferable, in terms of fast reactivity and heat resistance.

The thickness of the primer layer 8 is preferably 1 µm or more. If the thickness of the primer layer 8 is less than 1 µm, the primer layer 8 is melted during bonding to the decorative plate substrate, depending on the type of solvent in the adhesive, and the primer layer 8 disappears; thus, the adhesion is not improved.

When the silica contained in the primer layer 8 has a particle size of 1 to 4 µm and a pore volume of 0.4 to 2.0 ml/g, the adhesive is well absorbed, and the cohesive force of the primer is not affected.

The content of silica is set to 5 parts by weight or more and 30 parts by weight or less relative to 100 parts by weight of the primer resin, in consideration of the absorbability, permeability, and blocking resistance of the adhesive. If the content of silica is less than 5 parts by weight, adhesion and blocking resistance are poor; whereas if the content of silica exceeds 30 parts by weight, the primer undergoes an interlayer-peeling phenomenon.

Method for Producing Embossed Decorative Sheet 1

The method for producing the embossed decorative sheet 1 (1c) of the present embodiment will now be described.

As described above, in the embossed decorative sheet 1 (1c) of the present embodiment, the primer layer 8 is formed on the back surface of the thermoplastic resin substrate sheet 2 provided in the embossed decorative sheet 1 (1a, 1b) described in the first embodiment. Accordingly, in the method for producing the embossed decorative sheet 1 (1c) of the present embodiment, each production process before formation of the primer layer 8 is the same as each production process of the embossed decorative sheet 1 (1a, 1b) described in the first embodiment. Therefore, each production process before formation of the primer layer 8 is described only briefly herein.

As shown in FIG. 3, a transparent thermoplastic resin layer 5 is formed using a multilayer extruder 12 on a laminate in which a thermoplastic resin substrate sheet 2, a patterned layer 3, and an adhesive layer 4 are laminated in this order.

Next, the laminate of the thermoplastic resin substrate sheet 2, the patterned layer 3, the adhesive layer 4, and the transparent thermoplastic resin layer 5 is gripped between an embossing roll 9 and a pressure roll 10 to perform embossing and lamination at the same time.

Thereafter, the sheet integrated by embossing and lamination is peeled by a peeling roll 11, thereby producing an embossed decorative sheet 1 (1a, 1b) that does not have a primer layer 8.

Thereafter, surface activation treatment is applied to the back surface of the thermoplastic resin substrate sheet 2 provided in the embossed decorative sheet 1 (1a, 1b).

Finally, a primer layer 8 is formed on the back surface to which surface activation treatment is applied.

The embossed decorative sheet 1 (1c) of the present embodiment is produced in this manner.

In the present embodiment, as shown in FIG. 4, the insertion position of the laminate of the thermoplastic resin substrate sheet 2, the patterned layer 3, and the adhesive layer 4 may also be placed between the embossing roll 9 and the peeling roll 11, as in the first embodiment. The surface activation treatment mentioned above may be applied to the back surface of the thus-produced embossed decorative sheet 1 (1a, 1b), and a primer layer 8 may be formed on the back surface.

Effects of Present Embodiment

The invention according to the present embodiment exhibits the following effects.

(1) As described above, in the embossed decorative sheet 1 according to the present embodiment, a patterned layer 3, an adhesive layer 4, a transparent thermoplastic resin layer 5, and a surface protective layer 6 are laminated in this order on a thermoplastic resin substrate sheet 2; an embossed pattern 7 is formed in at least the transparent thermoplastic resin layer 5; surface activation treatment is applied to the back surface of the thermoplastic resin substrate sheet 2; and a primer layer 8 is provided on the surface to which surface activation treatment is applied. Moreover, the transparent thermoplastic resin layer 5 has a tensile elongation in the range of 50% or more and 700% or less, and a tensile elastic modulus in the range of 2000 kgf/cm$^2$ or more and 10000 kgf/cm$^2$ or less.

Owing to the use of the characteristics of resins that have a tensile elongation and a tensile elastic modulus within the above ranges, cutting properties, machining properties, and low-temperature bending properties can be improved.

That is, the embossed decorative sheet 1 according to the present embodiment makes it possible to obtain characteristics that can be obtained from polyvinyl chloride resins, such as flexibility, stain resistance, chemical resistance, weather resistance, scratch resistance, and designability (mainly transparency), without using polyvinyl chloride resins; and to form an embossed pattern 7 having excellent reproducibility.

(2) Moreover, the primer layer 8 may contain silica at a ratio of 5 parts by weight or more and 30 parts by weight or less, relative to 100 parts by weight of the primer resin.

If silica is used, the adhesive for bonding together an olefin-based resin decorative sheet and a substrate is absorbed or infiltrated into the primer layer to some extent. As a result, the adhesion to the olefin-based decorative sheet and the substrate can be improved.

(3) Moreover, the transparent thermoplastic resin layer 5 may be formed in such a manner that a first resin layer 51 containing a first resin and a second resin layer 53 containing a second resin that is different from the first resin are laminated in this order from the thermoplastic resin substrate sheet 2 side, and the second resin layer 53 may have a tensile elongation in the range of 50% or more and 700% or less, and a tensile elastic modulus in the range of 2000 kgf/cm$^2$ or more and 10000 kgf/cm$^2$ or less.

The first resin layer 51 ensures adhesion to the thermoplastic resin substrate sheet 2, and the second resin layer 53 serves as a main part of the layer (transparent thermoplastic resin layer 5) to ensure other physical properties; thus, the range of material design can be expanded.

(4) Moreover, the surface protective layer 6 may contain a thermosetting resin, an ionizing radiation-curable resin, or a mixture thereof, and may further contain an ultraviolet absorber, a light stabilizer, or a mixture thereof.

If the above resin is used in the surface protective layer 6, the surface strength and the post-processing properties can be balanced well. Furthermore, if an ultraviolet absorber and a light stabilizer mentioned above are added, there is an advantageous effect for the embrittlement resistance of the surface of the film and resin, and practical weather resistance can be obtained.

(5) Moreover, the light stabilizer contained in the surface protective layer 6 may be an amine-based light stabilizer.

The above light stabilizer exhibits effects in such a manner that nitroxyl radical oxidants capture radicals, and nitroxyl radicals are reproduced via alkoxyamine compounds, and thus act effectively over a long period of time. Therefore, the above light stabilizer is preferable for use in decorative sheets that are used as building materials for a long period of time.

(6) Moreover, the light stabilizer contained in the surface protective layer 6 may be an aminoether-based light stabilizer.

Because aminoether-based light stabilizers do not undergo neutralization with acid, the weather resistance is not deteriorated even upon exposure to acidic substances, such as acidic detergents, pesticides, and acid rain, and the effects can last for a long period of time.

(7) Moreover, the first resin layer 51 may be a layer containing transparent maleic acid-modified polypropylene, and the second resin layer 53 may be a layer containing transparent polypropylene, and an ultraviolet absorber, a light stabilizer, or a mixture thereof.

If the first resin layer 51 is a layer containing transparent maleic acid-modified polypropylene, the adhesion to the thermoplastic resin layer can be improved.

Furthermore, if the second resin layer 53 is a layer containing transparent polypropylene, and an ultraviolet absorber, a light stabilizer, or a mixture thereof, there is an advantageous effect for the embrittlement resistance of the interior of the resin, and further weather resistance can be exhibited.

(8) Moreover, the light stabilizer contained in the second resin layer 53 may be an amine-based light stabilizer.

The above light stabilizer exhibits effects in such a manner that nitroxyl radical oxidants capture radicals, and nitroxyl radicals are reproduced via alkoxyamine compounds, and thus act effectively over a long period of time. Therefore, the above light stabilizer is preferable for use in decorative sheets that are used as building materials for a long period of time.

(9) Moreover, the light stabilizer contained in the second resin layer 53 may be an aminoether-based light stabilizer.

Because aminoether-based light stabilizers do not undergo neutralization with acid, the weather resistance is not deteriorated even upon exposure to acidic substances, such as acidic detergents, pesticides, and acid rain, and the effects can last for a long period of time.

(10) Moreover, in the method for producing the embossed decorative sheet 1 according to the present embodiment, a patterned layer 3 is formed by printing on a thermoplastic resin substrate sheet 2, a plurality of layers containing a molten transparent thermoplastic resin are then extruded from a multilayer extruder 12 and laminated on the patterned layer 3 to thereby form a transparent thermoplastic resin layer 5, and the transparent thermoplastic resin layer 5 is embossed at the same time.

The embossed decorative sheet 1 described above can be produced by passing through these steps.

SECOND EXAMPLE

Examples and Comparative Examples of the present embodiment will now be described.

Example 2-1

A 60-μm polyolefin-based inorganic filler sheet (produced by Riken Technos Corporation) was used as a thermoplastic resin substrate sheet 2, and a woodgrain pattern was printed on the thermoplastic resin substrate sheet 2 by a gravure printing method to form a patterned layer 3. Then, a urethane resin-based adhesive was applied to the patterned layer 3, and dried by hot air to form an adhesive layer 4.

Subsequently, a plurality of layers containing a molten transparent thermoplastic resin were extruded from a T-die of a multiaxial extruder (extruded from the multilayer extruder 12) and laminated on the adhesive layer 4, thereby forming a transparent thermoplastic resin layer 5. The first resin used was transparent maleic acid-modified polypropylene (produced by Riken Vitamin Co., Ltd.), and the second resin used was a resin obtained by adding 0.2 parts by weight of a phenol-based antioxidant ("IRGANOX 1010," produced by BASF), 0.3 parts by weight of a hindered amine-based light stabilizer ("TINUVIN 622," produced by BASF), and 0.5 parts by weight of a benzotriazole-based ultraviolet absorber ("TINUVIN 326," produced by BASF) to a polypropylene resin (tensile elongation: 200%, tensile elastic modulus: 5000 kgf/cm$^2$).

Simultaneously, the laminate of the thermoplastic resin substrate sheet 2, the patterned layer 3, the adhesive layer 4, and the transparent thermoplastic resin layer 5 was gripped between a vessel embossing plate (embossing roll 9) and a rubber roll (pressure roll 10) to perform embossing and lamination at the same time. The thickness of the first resin layer 51 was 10 μm, and the thickness of the second resin layer 53 was 60 μm.

After surface treatment was applied to the embossed surface of the decorative sheet, a surface protective layer resin, which was obtained by adding 10 parts by weight of a curing agent ("UR150B Varnish," produced by Toyo Ink Co. Ltd.) to a urethane-based resin ("URV238 Varnish," produced by Toyo Ink Co. Ltd.), and adding thereto 0.5 parts by weight of a benzotriazole-based ultraviolet absorber ("TINUVIN 326," produced by BASF) and 1 part by weight of a hindered amine-based light stabilizer ("TINUVIN 622," produced by BASF), was applied by gravure coating so that the coating amount after drying was 5 g/m2, thereby obtaining a surface protective layer 6.

Furthermore, after surface activation treatment was applied to the back surface of the thermoplastic resin substrate sheet 2, this surface was coated with a primer coating liquid, which was obtained by adding 10 parts by weight of silica relative to 100 parts by weight of polyol ("Lamistar EM," produced by Toyo Ink Co. Ltd.), and adding 3 parts by weight of isocyanate ("LPNYB Curing Agent," produced by Toyo Ink Co. Ltd.), by gravure coating so that the coating amount after drying was 3 g/m$^2$, thereby obtaining a primer layer 8.

An embossed decorative sheet 1 of Example 2-1 was formed in the above manner.

Example 2-2

An embossed decorative sheet 1 was formed in the same manner as in Example 2-1, except that the light stabilizer was changed to an aminoether-based light stabilizer ("TINUVIN 123," produced by BASF).

Example 2-3

An embossed decorative sheet 1 was formed in the same manner as in Example 2-1, except that the light stabilizer was changed to an aminoether-based light stabilizer, and an ultraviolet absorber was not used in the second resin.

Example 2-4

An embossed decorative sheet 1 was formed in the same manner as in Example 2-1, except that a light stabilizer was not used in the second resin.

Example 2-5

An embossed decorative sheet 1 was formed in the same manner as in Example 2-1, except that the light stabilizer was changed to an aminoether-based light stabilizer, and an ultraviolet absorber was not used in the surface protective layer 6.

Example 2-6

An embossed decorative sheet 1 was formed in the same manner as in Example 2-1, except that a light stabilizer was not used in the surface protective layer 6.

Comparative Example 2-1

Tensile Elastic Modulus Was Too High

An embossed decorative sheet 1 was formed in the same manner as in Example 2-1, except that a polypropylene resin having a tensile elongation of 120% and a tensile elastic modulus of 12000 kgf/cm$^2$ was used as the second resin.

Comparative Example 2-2

Tensile Elastic Modulus Was Too Low

An embossed decorative sheet 1 was formed in the same manner as in Example 2-1, except that a polypropylene resin having a tensile elongation of 200% and a tensile elastic modulus of 1000 kgf/cm$^2$ was used as the second resin.

Comparative Example 2-3

Amount of Silica in Primer Was Insufficient

An embossed decorative sheet 1 was formed in the same manner as in Example 2-1, except that the amount of silica added to the primer coating liquid was changed to 3 parts by weight.

Comparative Example 2-4

Amount of Silica in Primer Was Excessive

An embossed decorative sheet 1 was formed in the same manner as in Example 2-1, except that the amount of silica added to the primer coating liquid was changed to 40 parts by weight.

Comparative Example 2-5

No Weather-Proofing Agent was Used in Thermoplastic Resin Layer

An embossed decorative sheet 1 was formed in the same manner as in Example 2-1, except that neither light stabilizer nor an ultraviolet absorber were not used in the second resin.

Comparative Example 2-6

No Weather-Proofing Agent was Used in Surface Protective Layer

An embossed decorative sheet 1 was formed in the same manner as in Example 2-1, except that a light stabilizer or an ultraviolet absorber was not used in the surface protective layer 6.

Evaluation Method

Machining property evaluation: A medium-density fiberboard (MDF) substrate with a thickness of 12 mm was coated with an ethylene-vinyl acetate copolymer emulsion adhesive, and bonded together with the primer layer 8 side of the embossed decorative sheet 1 to thereby obtain a decorative plate.

The decorative plate was cut with a circular saw, and subjected to a machining test using a hand router so that the MDF was exposed at the surface. Then, the formation of burrs on the sheet was checked.

A: Burrs were not formed.
C: Burrs were formed.

Low-temperature bending property evaluation: A V-groove was made from the MDF side of the above decorative plate so that the groove reached the embossed decorative sheet 1, and the sheet was allowed to stand in a low-temperature environment at 5° C. for 3 hours. Immediately after that, bending was performed, and the presence of whitening in the sheet at the bent portion was checked.

A: Whitening was not observed.
C: Whitening was observed.

Primer adherence: A Sellotape (registered trademark) adherence test was performed on the primer layer 8 using Nichiban tape, and the primer adherence was checked.

A: Primer was not peeled.
C: Primer was peeled.

Adhesion to decorative plate substrate: A 1-inch width cut was made on the embossed decorative sheet 1 side of the above decorative plate so that the cut reached the MDF substrate. Then, a 180° peel test was performed at a speed of 20 mm/min using a Tensilon, and the adhesion strength was measured.

As a comparison subject, the adhesion strength of a product obtained by bonding a chloride vinyl sheet and MDF together was measured in the same manner, and the adhesion strength was compared.

A: The adhesion strength was equivalent to or higher than the adhesion strength of the chloride vinyl sheet.
C: The adhesion strength was lower than the adhesion strength of the chloride vinyl sheet.

Weather resistance evaluation (1): The following test conditions were repeated using a metal weather tester (Daipla Metal Weather KU-R5DC1-A, produced by Daipla Wintes Co., Ltd.), and an accelerated weathering test was performed for 144 hours.

Test conditions: Light (53° C., 50% RH) at an illuminance of 65 mW/cm² for 20 hours, and then Dew (30° C., 95% RH) for 4 hours; thus, 1 cycle was completed. Water spraying was carried out for 30 seconds before and after Dew.

Evaluation criteria were as follows.

| Surface cracks | A: Cracks were not formed. |
| | B: Slight cracks were observed. |
| | C: Cracks were formed. |
| Discoloration of patterned layer | A: Discoloration did not occur. |
| | B: Slight discoloration occurred. |
| | C: Discoloration was observed. |

Weather resistance evaluation (2): After a commercially available acidic pesticide was sprayed onto the test sample and then dried, the same accelerated weathering test as in the weather resistance evaluation (1) was performed. The evaluation criteria were the same as those of the weather resistance evaluation (1).

Evaluation Results

The following tables show the evaluation results.

TABLE 1

| | Example 2-1 | Example 2-2 | Example 2-3 | Example 2-4 | Example 2-5 | Example 2-6 |
| --- | --- | --- | --- | --- | --- | --- |
| Machining properties | A | A | A | A | A | A |
| Low-temperature bending properties | A | A | A | A | A | A |
| Primer adherence | A | A | A | A | A | A |
| Adhesion to decorative plate substrate | A | A | A | A | A | A |
| Weather resistance 1  Crack | A | A | A | B | A | B |
| Discoloration | A | A | B | B | B | B |
| Weather resistance 2  Crack | A | A | A | B | A | B |
| Discoloration | B | A | B | B | B | B |

TABLE 2

| | Comparative Example 2-1 | Comparative Example 2-2 | Comparative Example 2-3 | Comparative Example 2-4 | Comparative Example 2-5 | Comparative Example 2-6 |
| --- | --- | --- | --- | --- | --- | --- |
| Machining properties | C | C | A | A | A | A |
| Low-temperature bending properties | C | A | A | A | A | A |
| Primer adherence | A | A | C | A | A | A |
| Adhesion to decorative plate substrate | A | A | C | C | A | A |
| Weather resistance 1  Crack | A | A | A | A | B | B |
| Discoloration | A | A | A | A | C | C |
| Weather resistance 2  Crack | A | A | A | A | C | C |
| Discoloration | B | B | B | B | C | C |

Comparative Example 2-1 revealed that when the tensile elastic modulus of the transparent thermoplastic resin layer 5 exceeded 10000 kgf/m², burrs were formed by machining after the decorative plate was formed, and whitening occurred in the bent part in the low-temperature bending test.

Moreover, Comparative Example 2-2 revealed that when the tensile elastic modulus of the transparent thermoplastic resin layer 5 was less than 2000 kgf/m², burrs were formed by machining after the decorative plate was formed.

Comparative Example 2-3 and Comparative Example 2-4 revealed that when the amount of silica added to the primer layer 8 was outside the suitable range, the primer adherence and the adhesion to the decorative plate substrate were reduced.

Furthermore, Comparative Example 2-5 and Comparative Example 2-6 revealed that the weather resistance decreased when an ultraviolet absorber and a light stabilizer were not added to the transparent thermoplastic resin layer 5 and the surface protective layer 6.

In addition, Example 2-1 and Example 2-2 revealed that the use of an aminoether-based light stabilizer as the light stabilizer was more effective in the weathering test exposed to the acidic conditions.

As described above, when an embossed decorative sheet 1 is produced within the range of each Example, it is possible to provide an embossed decorative sheet 1 that has excellent machining properties and low-temperature bending properties; that has an adhesion to the primer and the substrate equivalent to or higher than that of vinyl chloride decorative sheets; and that has weather resistance that can endure practical use.

Modifications of Each Embodiment (1) In the first embodiment, regarding the thickness of each of the first resin layer 51 and the second resin layer 53, which constitute the transparent thermoplastic resin layer 5, the first resin layer 51 is thicker than the second resin layer 53, as shown in FIGS. 1 and 2; however, the present invention is not limited thereto. For example, as shown in FIG. 5, the thickness of the second resin layer 53 may be larger than the thickness of the first resin layer 51. Even in such a case, the above-described effects can be obtained.

(2) Moreover, in the first embodiment, the embossed pattern 7 is also formed in the first resin layer 51, as shown in FIGS. 1 and 2; however, the present invention is not limited thereto. For example, as shown in FIG. 5, the embossed pattern 7 may not be formed in the first resin layer 51. Even in such a case, the above-described effects can be obtained.

(3) Moreover, in the second embodiment, the transparent thermoplastic resin layer 5 only includes the first resin layer 51 and the second resin layer 53, as shown in FIG. 5; however, the present invention is not limited thereto. For example, as shown in FIGS. 1 and 2, the adhesive layer 52 may be provided between the first resin layer 51 and the second resin layer 53. Even in such a case, the above-described effects can be obtained.

(4) Moreover, in the second embodiment, the embossed pattern 7 is not formed in the first resin layer 51, as shown in FIG. 5; however, the present invention is not limited thereto. For example, as shown in FIGS. 1 and 2, the embossed pattern 7 may also be formed in the first resin layer 51. Even in such a case, the above-described effects can be obtained.

(5) The resins and additives contained in each layer described in the first embodiment, the physical property values of each layer, etc., can be applied to each corresponding layer described in the second embodiment. Furthermore, the resins and additives contained in each layer described in the second embodiment, the physical property values of each layer, etc., can be applied to each corresponding layer described in the first embodiment. For example, the transparent thermoplastic resin layer 5 described in the first embodiment may have the tensile elongation and tensile elastic modulus of the transparent thermoplastic resin layer 5 described in the second embodiment. That is, each layer described in the first embodiment and each layer described in the second embodiment can be replaced with each other.

Reference Example

An embossed decorative sheet and a method for producing the same, neither of which have the technical features of the embossed decorative sheet 1 (1c) and the method for producing the same according to the present embodiment mentioned above, are briefly described below as a reference example of the embossed decorative sheet 1 (1c) and the method for producing the same according to the present embodiment.

Conventionally, there are embossed decorative sheets that are bonded together with surfaces of wooden boards, inorganic boards, steel plates, etc., using an adhesive to form decorative plates. As such embossed decorative sheets, those using vinyl chloride resins are generally used. However, chlorine generation from incineration, etc. has recently been problematic, and there have been demands for embossed decorative sheets that do not use vinyl chloride resins (e.g., JP H05-278137 A and JP H06-328635 A).

As alternatives for vinyl chloride resins, olefin-based thermoplastic resin sheets are generally used.

However, when generally used olefin-based resins are formed into decorative plates and then further subjected to post processing, cutting using a circular saw etc. or machining using a router etc. may cause burrs in the decorative sheets on the cut or machined surface.

Furthermore, whitening and cracking may occur in the bent part during bending at a low temperature.

In addition, olefin-based sheets are less chemically reactive than vinyl chloride; thus, in order to ensure adhesion strength with the decorative plate substrate, a primer is applied to the back surface of the sheet to form a primer layer.

However, adhesion equivalent to that of chloride vinyl sheets cannot always be obtained by resins of conventional primer layers.

REFERENCE SIGNS LIST

1 . . . Embossed decorative sheet; 1a, 1b, 1c . . . Embossed decorative sheet; 2 . . . Thermoplastic resin substrate sheet; 3 . . . Patterned layer; 4 . . . Adhesive layer; 5 . . . Transparent thermoplastic resin layer; 6 . . . Surface protective layer; 7 . . . Embossed pattern; 8 . . . Primer layer; 9 . . . Embossing roll; 10 . . . Pressure roll; 11 . . . Peeling roll; 12 . . . Multilayer extruder; 51 . . . First resin layer; 52 . . . Adhesive layer; 53 . . . Second resin layer.

What is claimed is:

1. An embossed decorative sheet, comprising:
a patterned layer,
an adhesive layer,
a transparent thermoplastic resin layer, wherein the transparent thermoplastic resin layer comprises a mixture of polypropylene resins, wherein the mixture of polypropylene resins comprises a polypropylene resin to which a free terminal long chain branch is imparted and a polypropylene resin to which a free terminal long chain branch is not imparted, and
a surface protective layer are laminated in this order on a thermoplastic resin substrate sheet;
an embossed pattern is formed on at least an outermost layer of the surface protective layer; and
the transparent thermoplastic resin layer comprises a plurality of layers, wherein:
a surface activation treatment is applied to a surface of the thermoplastic resin substrate sheet on a side facing away from the patterned layer;
a primer layer is formed on the surface to which the surface activation treatment is applied;
the transparent thermoplastic resin layer has a tensile elongation in a range of 50% or more and 700% or less, and a tensile elastic modulus in a range of 2000 kgf/cm² or more and 10000 kgf/cm² or less; and the primer layer contains silica at a ratio of 5 parts by weight or more and 30 parts by weight or less, relative to 100 parts by weight of the primer resin.

2. The embossed decorative sheet of claim 1, wherein the transparent thermoplastic resin layer is formed in such a manner that a first resin layer containing a first resin, and a second resin layer containing a second resin that is different from the first resin are laminated in this order from the thermoplastic resin substrate sheet side.

3. The embossed decorative sheet of claim 2, wherein the second resin layer has a tensile elongation in a range of 50% or more and 700% or less, and a tensile elastic modulus in a range of 2000 kgf/cm² or more and 10000 kgf/cm² or less.

4. The embossed decorative sheet of claim 2, wherein:
the first resin is a transparent maleic acid-modified polypropylene resin; and
the second resin is a transparent polypropylene resin to which at least one of an ultraviolet absorber and a light stabilizer is added.

5. The embossed decorative sheet of claim 4, wherein the second resin layer contains the light stabilizer, and the light stabilizer is an amine-based light stabilizer.

6. The embossed decorative sheet of claim 4, wherein the second resin layer contains the light stabilizer, and the light stabilizer is an aminoether-based light stabilizer.

7. The embossed decorative sheet of claim 2, wherein
the first resin is a mixture of a thermoplastic acrylic resin and a polyvinylidene fluoride resin, or a thermoplastic acrylic resin; and
the second resin is a mixture of a polyvinylidene fluoride resin and a thermoplastic acrylic resin, or a polyvinylidene fluoride resin.

8. The embossed decorative sheet of claim 2, wherein:
the first resin is a polyolefin-based elastomer resin; and
the second resin is a polyurethane-based elastomer resin.

9. The embossed decorative sheet of claim 2, wherein:
the first resin is a soft acrylic resin; and
the second resin is a hard acrylic resin.

10. The embossed decorative sheet of claim 2, wherein:
the first resin is a polypropylene resin; and
the second resin is a polyethylene terephthalate resin.

11. The embossed decorative sheet of claim 2, wherein:
the first resin is a polypropylene resin; and
the second resin is an olefin-based elastomer resin.

12. The embossed decorative sheet of claim 1, wherein the surface protective layer contains a thermosetting resin, an ionizing radiation-curable resin, or a mixture of these resins, to all of which at least one of an ultraviolet absorber and a light stabilizer is added.

13. The embossed decorative sheet of claim 12, wherein the surface protective layer contains the light stabilizer, and the light stabilizer is an amine-based light stabilizer.

14. The embossed decorative sheet of claim 12, wherein the surface protective layer contains the light stabilizer, and the light stabilizer is an aminoether-based light stabilizer.

15. The embossed decorative sheet of claim 1, wherein the mixture of polypropylene resins exhibits an isotactic index from 1% to less than 90% as determined by the percentage of a boiling heptane soluble residue.

16. The embossed decorative sheet of claim 1, wherein the mixture of polypropylene resins exhibits a molecular weight distribution of less than 5.

17. The embossed decorative sheet of claim 1, wherein the mixture of polypropylene resins exhibits a melt flow rate of 5 g/10 min to less than 50 g/10 min.

18. A method for producing the embossed decorative sheet of claim 1, comprising the steps of:
a patterned layer is formed by printing on a thermoplastic resin substrate sheet;
a plurality of layers containing a molten transparent thermoplastic resin are then extruded from a multilayer extruder and laminated on the patterned layer to thereby form a transparent thermoplastic resin layer;
the transparent thermoplastic resin layer is simultaneously embossed; and
a surface protective layer is then formed on the transparent thermoplastic resin layer.

19. An embossed decorative sheet, comprising:
a patterned layer,
an adhesive layer,
a transparent thermoplastic resin layer, wherein the transparent thermoplastic resin layer comprises a mixture of polypropylene resins, wherein the mixture of polypropylene resins comprises a polypropylene resin to which a free terminal long chain branch is imparted and a polypropylene resin to which a free terminal long chain branch is not imparted, and
a surface protective layer are laminated in this order on a thermoplastic resin substrate sheet;
an embossed pattern is formed on at least an outermost layer of the surface protective layer; and
the transparent thermoplastic resin layer comprises a plurality of layers, wherein the surface protective layer contains a thermosetting resin, an ionizing radiation-curable resin, or a mixture of these resins, to all of which at least one of an ultraviolet absorber and a light stabilizer is added and wherein the surface protective layer contains the light stabilizer, and the light stabilizer is an aminoether-based light stabilizer.

20. An embossed decorative sheet, comprising:
a patterned layer,
an adhesive layer,
a transparent thermoplastic resin layer, wherein the transparent thermoplastic resin layer comprises a mixture of polypropylene resins, wherein the mixture of polypropylene resins comprises a polypropylene resin to which a free terminal long chain branch is imparted and a polypropylene resin to which a free terminal long chain branch is not imparted, and
a surface protective layer are laminated in this order on a thermoplastic resin substrate sheet;
an embossed pattern is formed on at least an outermost layer of the surface protective layer; and
the transparent thermoplastic resin layer comprises a plurality of layers, wherein the mixture of polypropylene resins exhibits an isotactic index from 1% to less than 90% as determined by the percentage of a boiling heptane soluble residue.

* * * * *